(12) United States Patent
Araujo

(10) Patent No.: US 9,639,340 B2
(45) Date of Patent: May 2, 2017

(54) SYSTEM AND METHOD OF LOADING VIRTUAL MACHINES

(71) Applicant: Google Inc., Mountain View, CA (US)

(72) Inventor: Nelson Araujo, Redmond, WA (US)

(73) Assignee: Google Inc., Mountain View, CA (US)

( * ) Notice: Subject to any disclaimer, the term of this patent is extended or adjusted under 35 U.S.C. 154(b) by 7 days.

(21) Appl. No.: 14/339,952

(22) Filed: Jul. 24, 2014

(65) Prior Publication Data

US 2016/0026485 A1      Jan. 28, 2016

(51) Int. Cl.
*G06F 9/445* (2006.01)
*G06F 9/455* (2006.01)
*G06F 9/44* (2006.01)

(52) U.S. Cl.
CPC .............. *G06F 8/63* (2013.01); *G06F 9/445* (2013.01); *G06F 9/4406* (2013.01); *G06F 9/45533* (2013.01); *G06F 9/45558* (2013.01); *G06F 2009/45562* (2013.01); *G06F 2009/45575* (2013.01)

(58) Field of Classification Search
CPC .... G06F 9/45533; G06F 9/5077; G06F 9/445; G06F 9/45558; G06F 4/06113; G06F 2009/45562; G06F 2009/45575; G06F 8/63; G06F 2201/84; G06F 9/4406; G06F 9/4553; G06F 3/1462; G06F 3/1415
See application file for complete search history.

(56) References Cited

U.S. PATENT DOCUMENTS 8,135,930 B1    3/2012  Mattox et al.
8,209,680 B1 *  6/2012  Le ..................... G06F 17/30067
                                                          713/1
2007/0094659 A1 *  4/2007  Singh ................... G06F 9/45533
                                                          718/1
2008/0222375 A1    9/2008  Kotsovinos et al.
2009/0150879 A1    6/2009  Raghunath
2009/0260007 A1 * 10/2009  Beaty .................... G06F 9/5077
                                                          718/1
2012/0096457 A1 *  4/2012  Gupta .................. G06F 9/45558
                                                          718/1
2012/0144391 A1 *  6/2012  Ueda .................... G06F 9/45558
                                                          718/1
2012/0151477 A1 *  6/2012  Sinha .................. G06F 9/45558
                                                          718/1
2012/0324183 A1   12/2012  Chiruvolu et al.
(Continued)

OTHER PUBLICATIONS

"Chapter 7. Block Devices in Xen" [online], <http://doc.opensuse.org/products/draft/SLES/SLES-xen_sd_draft/cha.xen.vbd.html>, Jul. 9, 2014, 4 pages.
"Install and Configure Virtual Machines on Hyper-V", [online], <http://technet.microsoft.com/en-us/magazine/ff432697.aspx>, Jul. 9, 2014, 2 pages.
"System Center Virtual Machine Manager", [online], <http://en.wikipedia.org/wiki/system_center_virtual_machine_manager>, Jul. 9, 2014, 2 pages.
(Continued)

*Primary Examiner* — Lewis A Bullock, Jr.
*Assistant Examiner* — Jacob Dascomb
(74) *Attorney, Agent, or Firm* — Lerner, David, Littenberg, Krumholz & Mentlik, LLP

(57) ABSTRACT

A system and method is provided of swapping a first virtual machine with a second virtual machine by modifying those portions of memory where the two machines differ. The differences may be determined by booting both the first and the second virtual machines and generating a difference file based on the differences in the memory occupied by the booted virtual machines.

14 Claims, 4 Drawing Sheets

(56) References Cited

U.S. PATENT DOCUMENTS

| | | | | |
|---|---|---|---|---|
| 2013/0036418 | A1* | 2/2013 | Yadappanavar | G06F 3/0611 718/1 |
| 2013/0332920 | A1* | 12/2013 | Laor | G06F 9/45558 718/1 |
| 2013/0346803 | A1 | 12/2013 | Chiruvolu et al. | |
| 2014/0095817 | A1 | 4/2014 | Hsu et al. | |
| 2014/0195752 | A1 | 7/2014 | Baron et al. | |

OTHER PUBLICATIONS

"VM Image PowerShell 'How to' Blog Post" [online], May 1, 2014, <http://azure.microsoft.com/blog>, 7 pages.

"Windows Azure Virtual Machines—Gotcha's!" [online], <http://blogs.msdn.com/b/narahari/archive/2013/01/15/windows-azure-virtual-machines-gotcha-s.aspx>, Jan. 14, 2013, 7 pages.

"Using Disk Images With VMware" [online], <http://www.techrepublic.com/blog/data-center/using-disk-images-with-vmware>, Sep. 11, 2006, 10 pages.

"Knowledge Base", [online], <http//kb.vmware.com/selfservice/microsites/search.do?language=en_US&cmd=displayKC&externalId=1013628>, Jul. 1, 2014, 3 pages.

"Using Differencing Disks" [online], <http://technet.microsoft.com/en-us/library/cc720381(v=ws.10).aspx>, Jul. 8, 2014, 2 pages.

"What's the difference between differential and incremental backups (and why should I care)?" [online], <http://www.acronis.com/en-us/resource/solutions/backup/2005/incremental-backups.html>, Jul. 8, 2014, 2 pages.

"v5: How to create Incremental and differential disk image (Backup, Differential, Image, Incremental, v5)" [online], http://kb.macrium.com/KnowledgebaseArticle50075.aspx, Jul. 8, 2014, 4 pages.

"Microsoft Azure" [online], <http://azure.microsoft.com/blog>, Apr. 14, 2014, 5 pages.

International Search Report and Written Opinion for PCT Application No. PCT/US2015/038275, dated Oct. 8, 2015.

International Preliminary Report on Patentability for PCT Application No. PCT/US2015/038275, dated Feb. 2, 2017.

* cited by examiner

SYSTEM AND METHOD OF LOADING VIRTUAL MACHINES

BACKGROUND

A computer may act as a virtual machine, e.g., the computer may emulate the configuration of a computer that is different from the server's configuration. For instance, a host server having Linux as its operating system may run a program that emulates a server that boots and runs a Windows operating system and Windows-compatible applications. That same server may subsequently or simultaneously run a program that emulates a personal computer that boots and runs MAC OS and MAC OS compatible applications.

The identical virtual machine may be used on multiple host computers or at different times. In such regard, the virtual machine may be loaded into the memory of the host computer and booted, and a snapshot image of the memory may be stored for future use on the same or other computers. When a virtual machine having the same characteristics is required, the image may be loaded directly into the host computer, e.g., from disk storage, instead of booting the machine from scratch.

BRIEF SUMMARY

In one aspect, a method is provided that includes loading a first and second virtual machine in a first and second computer memory, respectively, and storing a first image and second image, respectively, of the virtual machines. A set of differences between the first image and the second image may then be determined. The first image may then be loaded into a third computer memory, and the values of the third memory may be modified in accordance with the set of differences.

In another aspect, a system is provided that includes one or more processors and memory storing data and instructions, where the instructions are executable by the processor. The data may include a first image capturing a first virtual machine having a first operating system that has at least begun virtually booting. The instructions may include accessing a file identifying the differences between the first image and a second image, where the second image captures a second virtual machine having a second operating system that has at least begun virtually booting. The first image may then be modified in accordance with the file.

In yet another aspect, a system is provided that includes one or more processors and memory storing instructions, the instructions being executable by the processor, wherein the instructions include: creating a first, second and third virtual machine and storing a first, second and third image, respectively, of the virtual machines based on the memory values associated with the virtual machines; comparing the first image and the second image to generate a first set of differences between those two images; comparing the second image and the third image to generate a second set of differences between those two images; creating a copy of the first virtual machine based on the first image and storing the copy in memory; modifying the copy of the first virtual machine in accordance with the first set of differences; and modifying the modified copy of the first virtual machine in accordance with the second set of differences.

DETAILED DESCRIPTION

Overview

In certain aspects, the technology relates to swapping a first virtual machine with a second virtual machine in the same memory based on the differences between the machines. For instance, a first virtual machine may be booted and an image of the first virtual machine may be captured before or after the operating virtual machine has been completely booted. A second virtual machine may also be booted and a second image similarly captured. The captured images may be compared and their differences stored for later use. For example, the first virtual machine may be loaded in RAM and readied for use in anticipation of a request to access the first virtual machine. If a request is received to access the second virtual machine instead, the differences between the first and second image may be retrieved and applied to the image of the first virtual machine currently stored in memory. The second virtual machine may then be ready for use without rebooting the second virtual machine or loading the image of the entire second virtual machine into memory.

Example Systems

Figure 1:
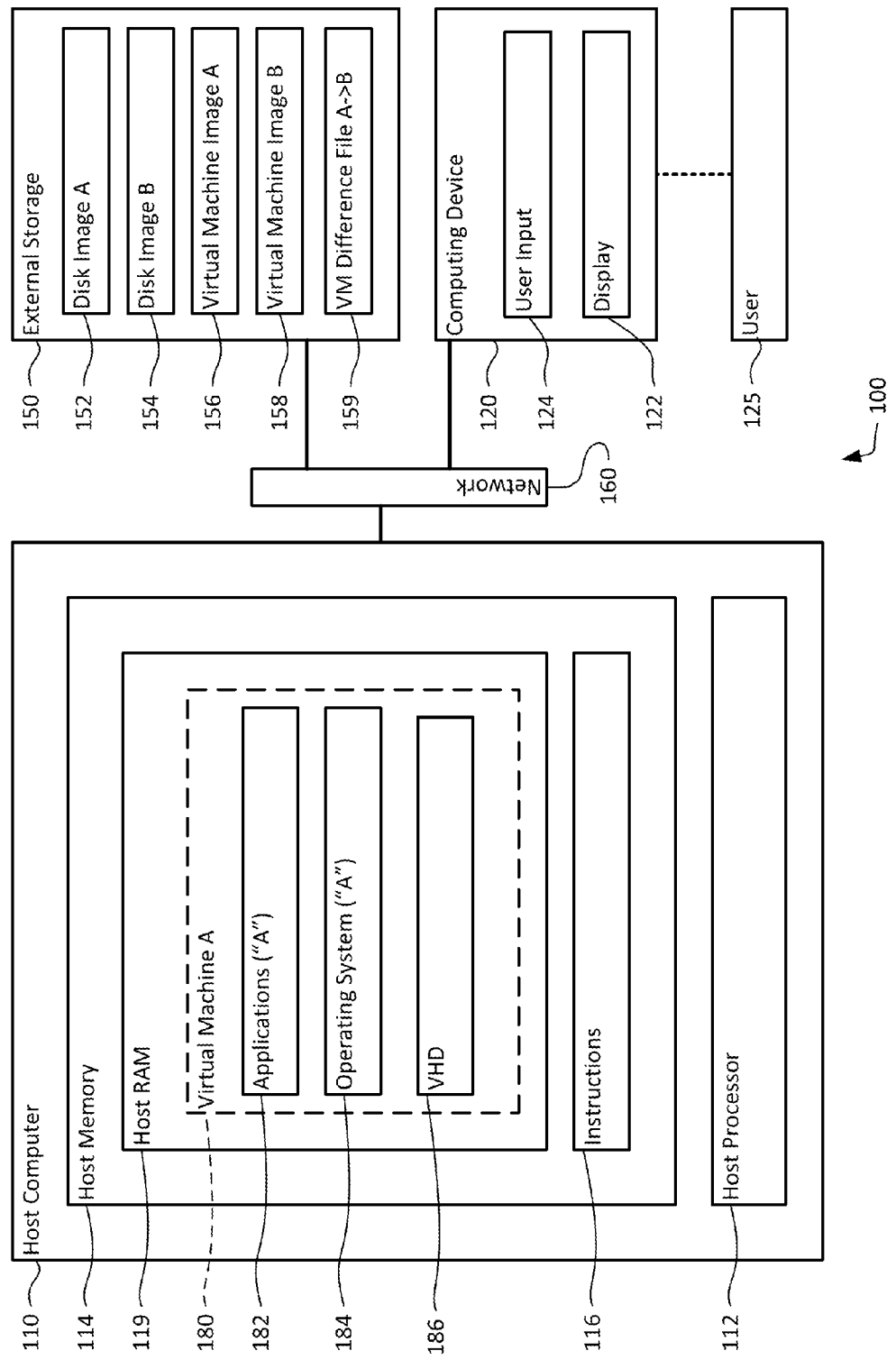
FIG. 1 is a functional diagram of a system in accordance with an aspect of the system and method.

FIG. 1 illustrates one possible system 100 in which the aspects disclosed herein may be implemented. In this example, system 100 may include computing devices 110 and 120. Computing device 110 may contain one or more processors 112, memory 114 and other components typically present in general purpose computing devices. Although FIG. 1 functionally represents processor 112 and memory 114 within a single block 110, the system may include, and the methods described herein may involve, multiple processors, memories and devices that may or may not be stored within the same physical housing. For instance, various methods described below as involving a single component (e.g., processor 112) may involve a plurality of components (e.g., multiple processors in a load-balanced server farm). Similarly, various methods described below as involving different components (e.g., device 110 and device 120) may involve a single component (e.g., rather than device 120 performing a determination described below, device 120 may send the relevant data to device 110 for processing and receive the results of the determination for further processing or display).

Memory 114 of computing device 110 may store information accessible by processor 112, including instructions 116 that may be executed by the processor 112. Memory 114 may also include data that may be retrieved, manipulated or stored by processor 112. Memory 114 and the other memories described herein may be any type of storage capable of storing information accessible by the relevant processor, such as a hard-disk drive, a solid state drive, a memory card, RAM 119, DVD, write-capable memory or read-only memory. In addition, the memory may include a distributed storage system where data, such as data 150, is stored on a plurality of different storage devices which may be physically located at the same or different geographic locations. Moreover, a file may consist of data that is transferred together or in portions from one memory to another memory, e.g., a file may consist of a collection of files or all or a portion of a database.

The instructions 116 may be any set of instructions to be executed by processor 112 or other computing device. In that regard, the terms "instructions," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. Processor 112 may be any conventional processor, such as a commercially available CPU. Alternatively, the processor may be a dedicated component such as an ASIC or other hardware-based processor.

Data may be retrieved, stored or modified by computing device 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The computing device 110 may be at one node of a network 160 and capable of directly and indirectly communicating with other nodes of network 160. Although only a few computing devices are depicted in FIG. 1, a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. As an example, computing device 110 may be a web server that is capable of communicating with computing device 120 via the network 160. Computing device 120 may be a client computing device, and server 110 may display information by using network 160 to transmit and present information to a user 125 of device 120 via display 122. Although certain advantages are obtained when information is transmitted or received as noted above, other aspects of the subject matter described herein are not limited to any particular manner of transmission of information.

Computing device 120 may be configured similarly to the server 110, with a processor, memory and instructions as described above. Computing device 120 may be a personal computing device intended for use by a user and have all of the components normally used in connection with a personal computing device such as a central processing unit (CPU), memory storing data and instructions, a display such as display 122 (e.g., a monitor having a screen, a touch-screen, a projector, a television, or other device that is operable to display information), and user input device 124 (e.g., a mouse, keyboard, touchscreen, microphone, etc.). Computing device 120 may also comprise a mobile computing device capable of wirelessly exchanging data with a server over a network such as the Internet. By way of example only, device 120 may be a mobile phone or a device such as a wireless-enabled PDA, a tablet PC, a wearable computing device or a netbook that is capable of obtaining information via the Internet. The device may be configured to operate with an operating system such as Google's Android operating system, Microsoft Windows or Apple iOS. Computing devices in accordance with the systems and methods described herein may include other devices capable of processing instructions and transmitting data to and from humans and/or other computers including network computers lacking local storage capability and set top boxes for televisions.

Example Methods

Operations in accordance with a variety of aspects of the invention will now be described. It should be understood that the following operations do not have to be performed in the precise order described below. Rather, various steps can be handled in any order or simultaneously.

A first virtual machine may be loaded into the memory of the host computer by virtually booting an operating system, e.g., an operating system different from the operating system of the virtual machine. By way of example only and as shown in FIG. 1, processor 112 on a Linux server 110 may access external storage 150 and retrieve Disk Image A 152, where Disk Image A contains the same type of data that a physical device would retrieve from a hard drive to boot an operating system. For example, Disk Image A may contain the same data as that stored on a hard disk of a personal computer that is used to boot Windows 7 upon startup. Instructions 116 may include a hypervisor that creates a virtual hard drive (VHD) 186 that is initially substantially equivalent to the data contained in Disk Image A. The hypervisor may then virtually boot an operating system (such as Operating System A 184) by executing files from the VHD and storing the resultant data and processes of the operating system 184 in Host RAM 119. As noted above, the system is not limited to a single type of memory. For instance, although VHD 186 is illustrated in FIG. 1 as being loaded into the host RAM, all or a portion of the data contained in the VHD may be stored outside of host RAM, such as on a physical hard drive of server 110.

In some circumstances, one or more applications may be automatically loaded along with the operating system. For instance, the virtual machine may emulate a computer running Windows 7 and SQL Server. In such an instance, Applications "A" 182 may also be loaded into RAM 119 from VHD 186.

After the virtual machine is completely or partially created, the processor may create a copy of the portions of the host's physical memory that store portions of the virtual machine. For instance, after virtual Operating System A is virtually booted and Applications A are loaded and executed, processor 112 may take a snapshot image of values stored at the addresses of Host RAM 119 that are occupied by the VHD 186, virtual Operating System A and Applications A. Although the remainder of this disclosure assumes that the virtual machine image is captured at this stage, a virtual machine image may be captured at other stages as well, such as by way of example only: after the virtual operating system has begun the process of booting but before the virtual operating system has finished booting, after the virtual operating system is booted and before the applications are loaded; after the applications are loaded but before execution of the applications begins; and other stages that are likely to place the virtual machine in a state that minimizes future load times and reflects user preferences. Moreover, less than all of the components of the virtual machine loaded in memory may be captured in the image, e.g., the virtual machine image may exclude VHD 186.

The copy of the virtual machine image may be stored for later retrieval. For instance, the virtual machine image 156 that captures Virtual Machine A ("VM-A") 180 may be stored in external storage 150 for later access by server 110.

Once the image of the first virtual machine is stored, the process may be repeated again for another virtual machine. For instance, processor 112 may cause server 110 to access external storage 150 and retrieve Disk Image B 154. Disk Image B may contain the same type of data that a physical device would retrieve from a hard drive to boot an operating system, such as Operating System B. By way of example, Operating System B may be Windows 8 and Virtual Machine B ("VM-B") may run a copy of Visual Studio on that operating system. The image of VMB may be captured and stored as image 158 in storage 150.

Differences between the two virtual machine images may then be identified. In many cases, there will be fewer differences between the virtual machine images than the disk images from which they were created. For instance, as long as the files are locatable, the various files of an operating system and applications may be physically stored anywhere on a disk and, thus, anywhere in the disk image. Moreover, even if two different physical machines to be emulated have the same operating system, each machine may have different application configurations and settings that may make their disk layout very distinct. On the other hand, once loaded into memory during the boot process, many operating systems are relatively consistent with respect to the allocation of memory. For instance, regardless of the location of the files on the disk and regardless of the precise physical machine upon which an OS operates, operating systems may still load the kernel to a reasonably fixed location, initialize the same device drivers in the same order, and allocate memory at the application layer in the same way.

Figure 2:
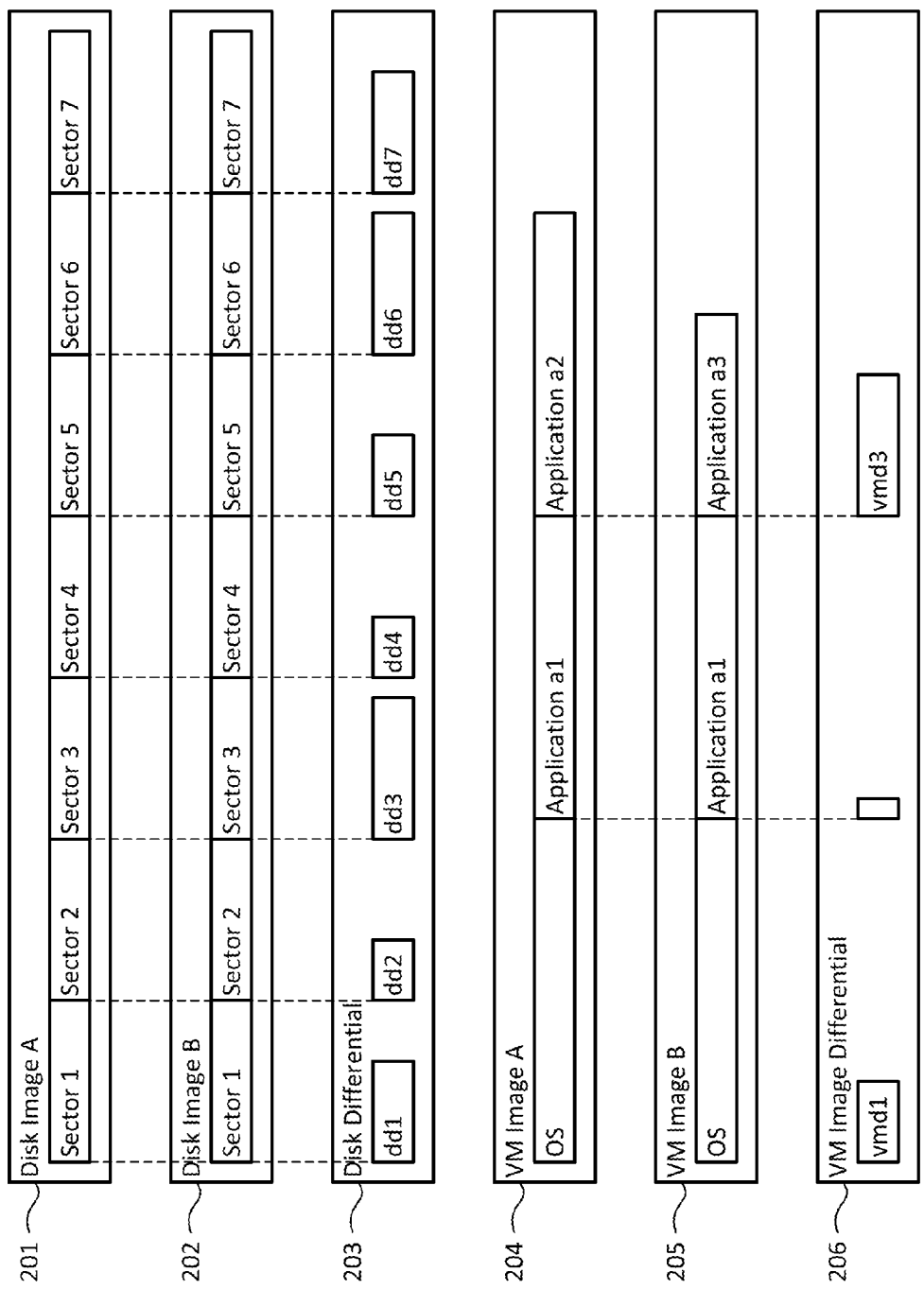
FIG. 2 is a functional diagram of comparisons of disk images and virtual images.

FIG. 2 provides a diagram of potential differences between the disk images and the virtual machine images described above. Disk Image A and Disk Image B 201-02 may be considered to include a series of sectors containing sequences of data at specific addresses. The length of the boxes labeled "dd" in chart 203 represent the extent of the difference between the respective sectors of the two disk images. For instance, even if the operating systems of the two disks may be quite similar, the location of the relevant information stored in the first sector of disk image A and the first sector of disk image B may be relatively large, as shown by the relative length of block dd1. (Scales are intended for illustration purposes only.)

The virtual machine images A and B booted from the disk images may not be as different as the disk images. For example, if Operating System A and Operating System B of virtual machine images 20405 are similar, the memory allocations within RAM may typically be very similar, resulting in relatively small difference such as vmd1 shown in Chart 206. If each operating system subsequently loaded the same Application a1 starting at the same address in RAM, the difference between the images of the applications may be even smaller. If each operating system then loaded a different application in memory such as Application a2 and Application a3, the differences vmd3 may be comparatively large but, in the aggregate, there may be relatively few differences between virtual machine images as compared to the disk images.

A set of differences that are determined to exist between the two virtual machine images may be stored for later use. By way of example, a binary diff algorithm such as bsdiff or Google's Courgette may be used to create a difference file that identifies the addresses at which the two virtual machine images differ when stored in the host device's RAM. The difference file may identify the values of one or both virtual machine images at those addresses. For purposes of illustration, difference file 159 shall be considered to store only the addresses at which Virtual Machine Image A 156 and Virtual Machine Image B 158 differ and the value of Virtual Machine Image B at that address.

The difference file may be used to swap one virtual machine for another. For instance, VM-A may represent a relatively popular operating system and application configuration and may thus be loaded in RAM 119 from VMA image 156 in anticipation of an end user requesting a virtual machine with that configuration.

The system may subsequently receive a request to load a different virtual machine than the one currently loaded in the host device. For instance, user 125 may transmit a request to server 110 for access to a virtual machine having the configuration of VM-B. In response to such a request, processor 112 may query external storage 150 to determine whether it contains a difference file for converting the currently loaded virtual machine (VM-A) to the newly-requested virtual machine (VM-B). If not, server 110 may load a full snapshot from which the newly-requested virtual machine is booted or, if available, the image of an already-booted virtual machine.

In the example of FIG. 1, the server determines that there is a difference file that may be used to swap the currently stored virtual machine with the newly-requested virtual machine, e.g., VM Difference File 159. Therefore, rather than reloading the entire Virtual Machine Image B 158, server 110 may retrieve the Difference File 159 and use the information contained in the file to modify only those portions of memory 119 necessary to convert the image of Virtual Machine A to the image of Virtual Machine B.

After the changes are made, the newly requested virtual machine may be ready for use by user 125. For instance, user 125 may use the input 124 and display 122 of monetary computing device 120 to communicate with Virtual Machine B via network 160.

Figure 3:
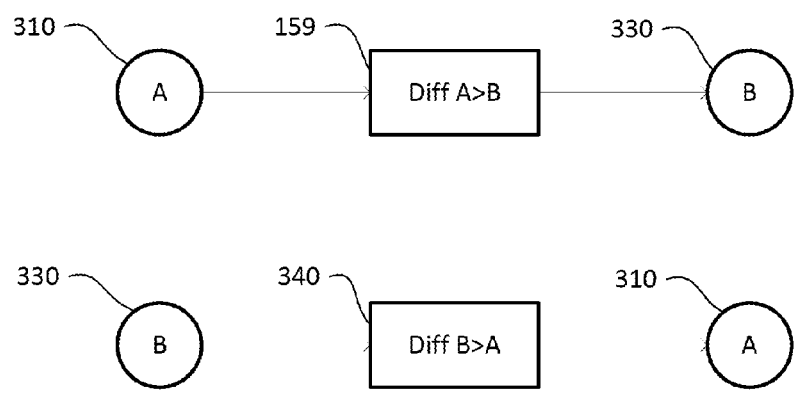
FIG. 3 is a diagram of a process of converting a first virtual machine to a second virtual machine.

The system may include a plurality of difference files representing different pairs of virtual machine conversions. For example, as shown in the upper diagram of FIG. 3 and explained above, the system may store a difference file 159 for converting from VM-A 310 to VM-B 330. The system may also store a second difference file 340 to convert the virtual machine stored in memory from VM-B 330 to VM-A 310. Yet other difference files may be stored to convert other virtual machines, such as from VM-A to a third virtual machine different from VM-B, or to convert from an unrelated fourth virtual machine to an unrelated firth virtual machine.

Figure 4:
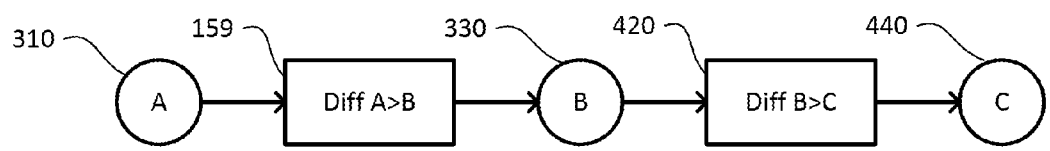
FIG. 4 is a diagram of a process of converting a first virtual machine to a third virtual machine.

In some aspects, the system may replace one virtual machine with another by first loading a virtual machine that is neither the currently-loaded virtual machine nor the currently-requested virtual machine. For example, as shown in FIG. 4, the system may contain two difference files: file 159 representing the memory values that need to be changed to change the memory from VM-A 310 to VM-B 330, and file 420 representing the memory values that need to be changed to replace VM-B with Virtual Machine C ("VM-C") 440. In that regard, if the system receives a request to change the virtual machine hosted by server 110 from VM-A to VM-C, and if the system determines that it does not contain a difference file between VM-A and VM-C, the system may determine whether it can use any other difference files to accomplish the conversion. For instance, the system may query whether there are two or more difference files that may be applied in sequence to obtain the desired image. In that regard, upon determining files 320 and 420, the system may first load VM-A in memory, apply difference file 320 to obtain a copy of VM-B, and then apply difference file 420 to obtain a copy of VMC. This aspect may be particularly advantageous when loading different versions of the same operating system, e.g., iterating through earlier versions of an operating system by applying the difference file between each version until the desired version is loaded in memory.

In another aspect, the system may automatically determine and generate files that store the differences between virtual machine images. By way of example, system 100 may store hundreds of different virtual machine images. The system 100 may identify the most popular images by tracking the frequency with which they are requested. The system may then automatically create difference files by selecting a given number of pairs of the most popular virtual machine images. The system may further track the most popular transitions between virtual machine images, e.g., for any given virtual machine image, the system may create a difference file between that image and the image that is most likely to be loaded after the given image.

As noted above, the first and second virtual machines may not share the same operating system. For instance, VM-A may emulate a Windows 8 personal computer for use by an individual user and VM-B may emulate a Linux web server.

Although most of the foregoing description has described most processes as occurring on the same host server 110, the processes may occur on different computing devices using different memories. For instance, VM-A may be created and captured at one node of network 160, the resultant virtual machine image may be stored at a second node, VM-B may be created and captured at a third node, the resultant virtual machine image may be stored at a fourth node, the comparison of the images may be performed at a firth node and may be stored at a sixth node, etc.

Figure 5:
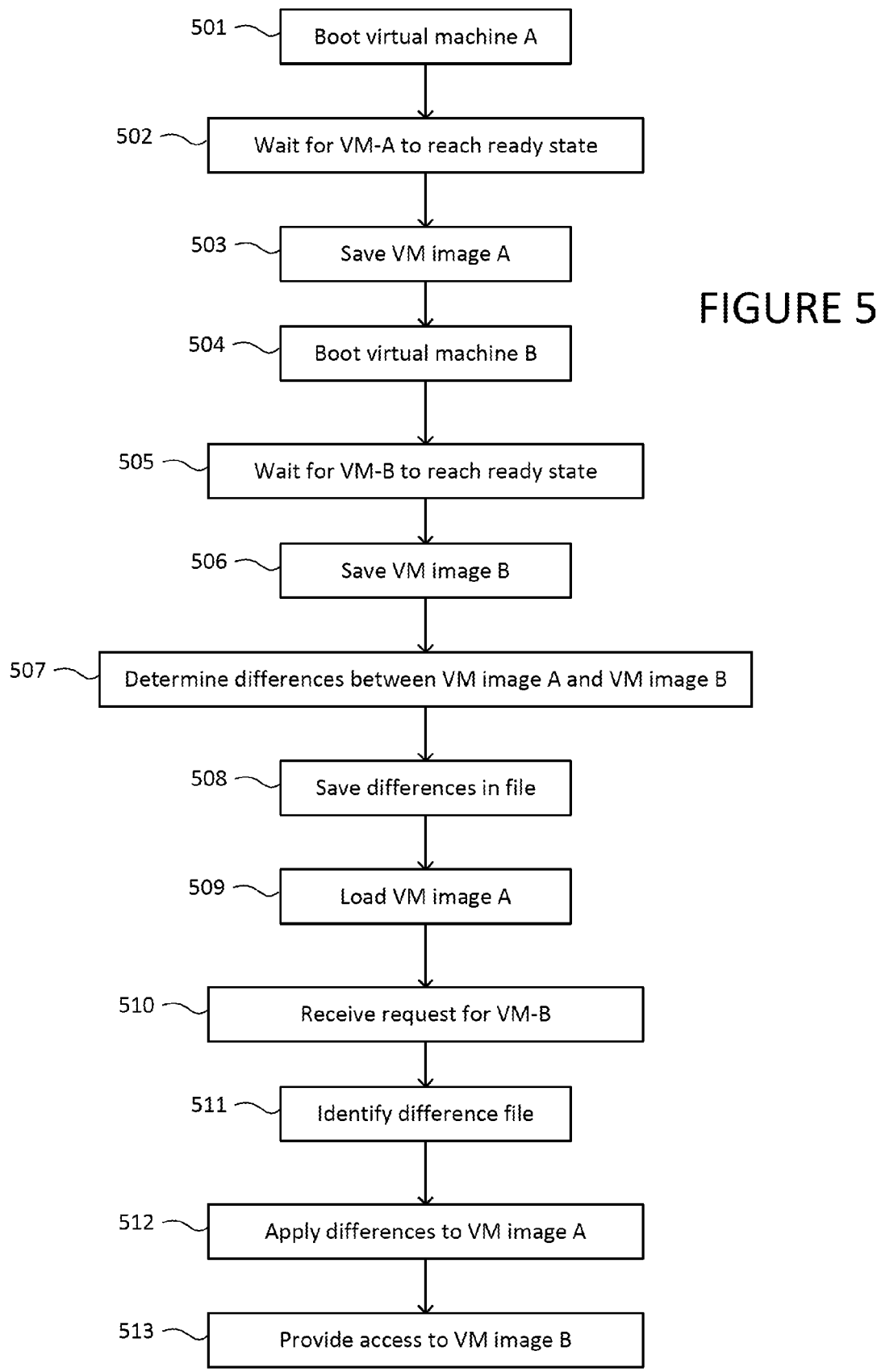
FIG. 5 is a flow chart of a process in accordance with an aspect of the disclosed system.

FIG. 5 is a flow chart of some of the processes described above. At block 501, a first virtual machine (VM-A) is booted. At block 502, the system waits for VM-A to reach a ready state and, once ready and at block 503, an image of VM-A is saved. At block 503, a first virtual machine B (VM-B) is booted. At block 504, the system waits for VM-B to reach a ready state and, once ready and at block 506, an image of VM-B is saved. At blocks 507-08, the differences between the image of VM-A and image of VM-B are determined and saved. At block 509, the image of VM-A is loaded. A request for VM-B is received (block 510) and the difference file between the images of VM-A and VM-B is identified (block 511). At block 512, the differences identified in the difference file are applied to the image of VM-A stored in memory and, at block 514, the requester is provided with access to VM-B, which is now stored in memory in place of VM-A. The requester may be originated by an end user or by another device that requires services provided by VM-B.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method comprising;
    booting a first virtual machine wherein at least a first portion of the processes and data resulting from booting an operating system of the first virtual machine are stored in a first host RAM by storing a first set of values at a first set of physical addresses of the first host RAM occupied by the first portion;
    booting a second virtual machine wherein at least a second portion of the processes and data resulting from booting an operating system of the second virtual machine are stored in a second host RAM by storing a second set of values at a second set of physical addresses of the second host RAM occupied by the second portion, the second virtual machine being different from the first virtual machine;
    booting a third virtual machine wherein at least a third portion of the processes and data resulting from booting an operating system of the third virtual machine are stored in a third host RAM by storing a third set of values at a third set of physical addresses of the third host RAM occupied by the third portion, the third virtual machine being different from the first and second virtual machines, wherein a subset of the first second and third set of values are different,
    generating a first set of differences comprising a set of values corresponding to the differences between the first set of values at the first set of physical addresses and the second set of values at the second set of physical addresses;
    generating a second set of differences comprising a set of addresses and values corresponding to the differences between the second set of values at the second set of physical addresses and the third set of values at the third set of physical addresses;
    receiving a request for access to a new virtual machine that is functionally equivalent to the third virtual machine;
    copying the first set of values to a fourth set of physical addresses of a fourth host RAM; and
    responsive to the request, performing the steps of:
        1) identifying the first and second set of differences,
        2) modifying the set of values in the fourth host RAM in accordance with the first set of difference,
        4) modifying the set of values in the fourth host RAM in accordance with the second set of differences, and
        5) providing access to the new virtual machine by providing access to the values stored in the fourth host RAM.

2. The method of claim 1 wherein the first, second and third host RAM, and the fourth memory, are the same memory in the same computing device.

3. The method of claim 1 wherein the first host RAM, second host RAM, third host RAM and fourth memory are different memories in different computing devices.

4. The method of claim 1 wherein the first set of differences is one of a plurality of sets of differences between sets of values at sets of physical addresses, the method further comprising:
    receiving a request for access to the second virtual machine, and before modifying the the copied first set of values, identifying the first set of differences from among the plurality of sets of differences based on the identity of a virtual machine image loaded in the fourth memory when the request is received.

5. The method of claim 1 wherein the first and second virtual machines have the same operating system.

6. A system comprising:
one or more processors; and
memory storing data and instructions, the instructions executable by the processor,
wherein the data comprises:
a first image capturing a first set of values stored at a first set of physical addresses of a first host RAM that are occupied by at least a portion of the processes and data resulting from at least beginning the process of booting a first virtual machine having a first operating system; and
wherein the instructions comprise, in response to a request for a new virtual machine having an associated operating system, the operations of:
identifying a first difference file and modifying the first image in accordance with the first difference file;
identifying a second difference file and modifying the modified first image in accordance with the second difference file,
wherein the first difference the identifies the differences between the first image and a second image capturing a second set of values at a second set of physical addresses of a second host RAM of a second virtual machine having a second operating system that has at least begun the process of virtually booting, the second virtual machine being different from the first virtual machine,
wherein the second difference file identifies the differences between the second image and a third image capturing a third set of values at a third set of physical addresses of a third host RAM of a third virtual machine having a third operating system that has at least begun the process of virtually booting, the third virtual machine being different from the first and second virtual machines,
wherein a subset of the first, second, and third set of values are different;
copying the first set of values to a fourth set of physical addresses of a fourth host RAM;
modifying the set of values in the fourth host RAM in accordance with the first set of difference;
modifying the set of values in the fourth host RAM in accordance with the second set of differences; and
providing access to the new virtual machine by providing access to the values stored in the fourth host RAM.

7. The system of claim 6 wherein the first image captures a first virtual machine having a first operating system that has completed booting and has loaded an application.

8. The system of claim 6 wherein the first operating system and second operating system are the same operating system, and wherein the first image captures the image of an application that the second image does not capture.

9. The system of claim 6 wherein the first operating system and second operating system are different versions of the same operating system.

10. The system of claim 6 wherein the request is received over a network from an end user and the instructions further comprise permitting the end user to operate the third virtual machine.

11. The system of claim 6 wherein booting a virtual machine comprises booting a virtual operating system.

12. The system of claim 11 wherein the first image captures the first set of values stored at the first set of physical addresses of the first host RAM that are occupied by at least a portion of the processes and data before the operating system of the first virtual machine has finished booting.

13. The system of claim 6 wherein the instructions further comprise identifying the first, second and third images for storing based on the frequency that the first, second and third virtual machines, respectively, are requested.

14. The system of claim 6 wherein the instructions further comprise identifying the second images for storing based on the frequency that the second virtual machine has been loaded into a memory occupied by the first virtual machine.

* * * * *